April 16, 1929. R. FORD 1,709,527
AUTOMATIC BRAKE MECHANISM FOR HAND PROPELLED VEHICLES
Filed April 12, 1927 2 Sheets-Sheet 2
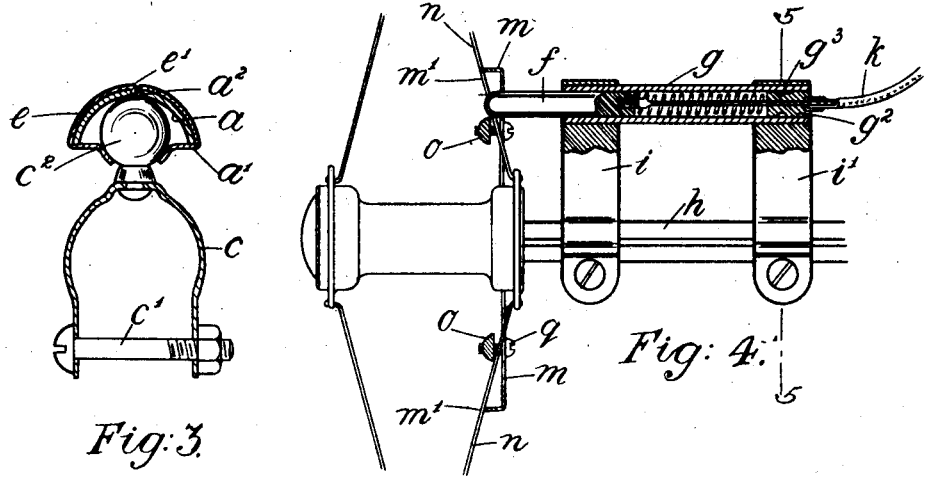
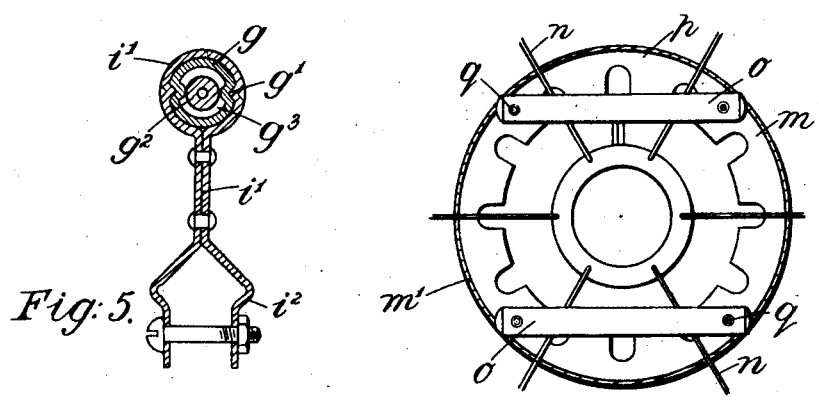
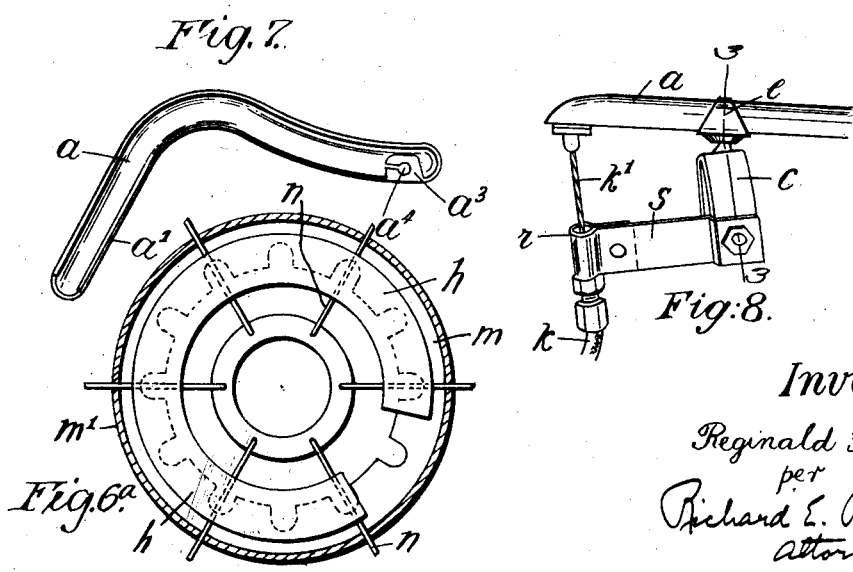
Inventor.
Reginald Ford
per
Richard E. Babcock
Attorney Patented Apr. 16, 1929.

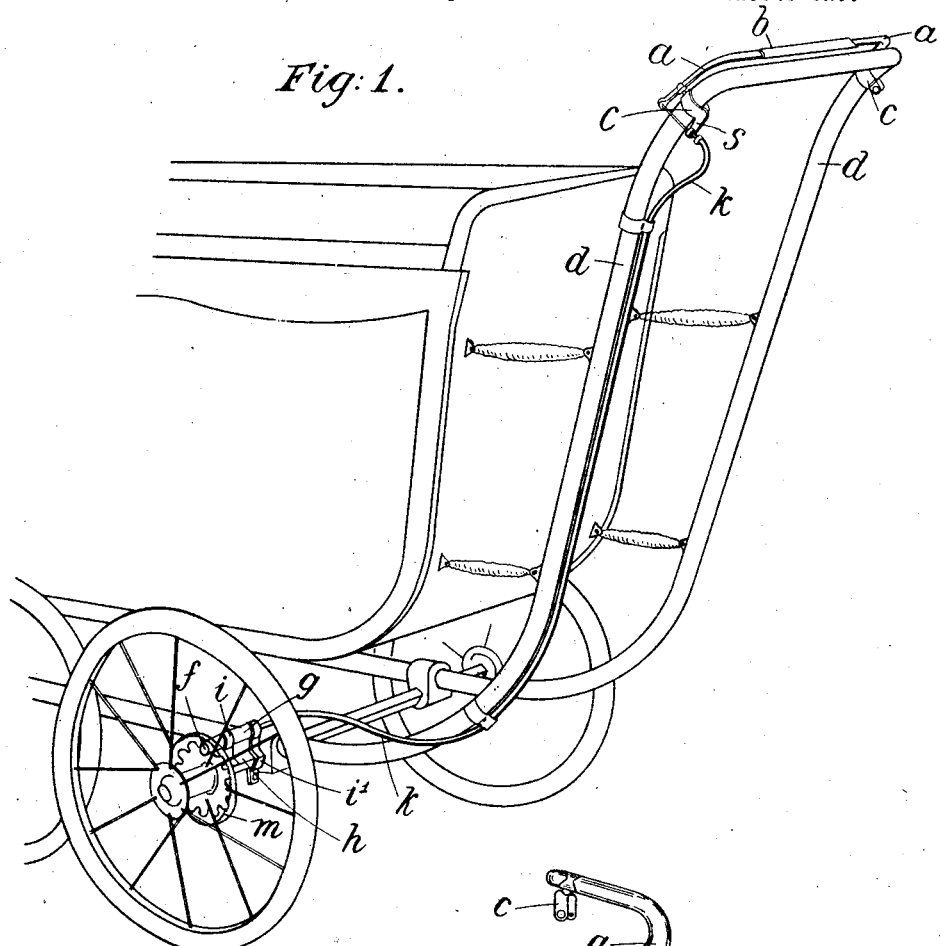
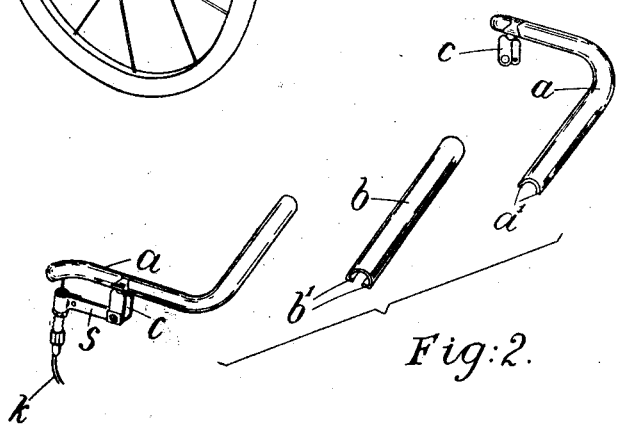

1,709,527

UNITED STATES PATENT OFFICE.

REGINALD FORD, OF COVENTRY, ENGLAND, ASSIGNOR, BY DIRECT AND MESNE ASSIGNMENTS, TO DAVID DUNCAN FARQUHARSON, OF LEAMINGTON SPA, ENGLAND.

AUTOMATIC BRAKE MECHANISM FOR HAND-PROPELLED VEHICLES.

Application filed April 12, 1927, Serial No. 183,207, and in Great Britain January 5, 1927.

This invention comprises certain improvements in automatic brake mechanism for perambulators, push-carts, invalid chairs and other hand propelled vehicles, of the kind in which as a consequence of the handle of the vehicle being released or forward pressure upon it being relaxed the brake comes automatically into action so that the vehicle cannot run away when left unattended on a gradient.

More particularly the improved brake mechanism is of the kind in which a lever arranged parallel with and close alongside the handle of the vehicle is connected by means of Bowden mechanism with a bolt mounted upon the axle the arrangement being such that when and so long as the handle and lever are grasped together the bolt is and remains inoperative but that immediately the handle and lever are released a spring forces the bolt into engagement with the wheel or with a disc thereon thus locking the vehicle.

The object of the present invention is so to construct the various elements of the mechanism as to produce a standardized brake attachment that will fit and work freely upon and in connection with any type of perambulator or the like.

According to this invention the lever is made adjustable in length to accommodate handles of different lengths and has a universally jointed connection at each end with the handle supports so as to enable the lever to be instantly applied irrespective of any variation in the angle between the handle and its supports. In order further to provide for variation in the position of the frame member of the vehicle on the axle relatively to the wheel the bolt is mounted in a casing which is adjustable longitudinally and carried by a pair of clips. By this means any overhang of the bolt can always be supported by the casing. The invention also includes a special form of disc which readily centers itself against the inside of the wheel and is characterized by a flanged and serrated edge between which and a plate or plates the spokes of the wheel are firmly clamped.

In the accompanying drawings:—

Figure 1 is a part view of a perambulator fitted with automatic brake mechanism embodying the present improvements.

Figure 2 is a detail view of the adjustable lever showing the parts dismantled.

Figure 3 is an enlarged sectional detail view taken on line 3—3 of Fig. 8 of one of the universally jointed attachments for the lever.

Figure 4 is a sectional view illustrating the bolt in engagement with the disc.

Figure 5 is an enlarged transverse sectional view taken on line 5—5 of Fig. 4 through the clip which supports the closed end of the casing for the bolt.

Figure 6 is an end view of Figure 4 as viewed from the left hand showing one method of attaching the disc to the wheel.

Figure $6^a$ is a view similar to Fig. 6 but showing a modified means for attachment of the disc.

Figure 7 is an underside view of one part of the divided lever showing the attachment lug for the Bowden wire.

Figure 8 is a detail of one of the attachment clips for the lever showing the stop for the Bowden wire.

Throughout the drawing like parts are designated by similar reference characters.

One of the first difficulties to be overcome in producing an automatic brake mechanism of the kind herein referred to for immediate application to any of the large number of different types of perambulators and the like arose from the fact that the handles of such vehicles vary considerably in width or length. In order to meet this requirement, without resorting to a range of levers of corresponding fixed lengths, it is proposed, according to this part of the present invention, to make the control lever of adjustable length and preferably in such a manner as not to increase its cost. It is very necessary if the brake mechanism is to function effectively under all conditions of use for the lever to extend the full length of the handle. A construction of adjustable lever which can be produced rapidly in large quantities at a very low cost and which at the same time provides instantaneous adjustment within its limits is illustrated in Figure 1 and more clearly in Figure 2. According to this construction the lever is made in two parts, $a$, $a$ each of which is formed from strip metal cut to length, bent to shape and pressed into an inverted channel section. These two parts are connected together by means of a metal sleeve $b$ which is also of inverted channel section with inturned longitudinal edges $b^1$ as shown. The inner ends of the two parts of the lever are adapted to telescope into the opposite ends of this sleeve their edges $a^1$ entering within the inturned edges $b^1$ of the latter so that the connection is quite rigid for any width to which the lever can be set. Adjustment for length of a lever made in this way is a very simple matter, all that is necessary being to slide the two parts nearer to or further away from each other according to the length or width of the vehicle handle in any particular case and to attach them at their outer ends to the handle shafts or supports in the manner hereinafter described.

The next difficulty which was experienced in applying the mechanism to different makes and types of perambulators, push-carts and the like arose from differences in the angle made between the handle of the vehicle and its shafts or supports. Some of these are at right angles to the handle whilst others are splayed at different angles, either outwardly or inwardly. In order to provide a form of attachment which could readily be applied in every case it became obvious that some form of universally jointed connection was essential so that notwithstanding the variations in the angle of the supports relatively to the handle the control lever can be instantly attached in every case with complete freedom of action.

A convenient and inexpensive form of such a universal mounting for each end of the control lever is depicted in Figure 3. It comprises a clip $c$ adapted for ready attachment to the handle shaft or support $d$ by means of a bolt $c^1$ passing transversely through the limbs of the clip. At the closed end of the clip a ball $c^2$ is fixed which projects above or beyond the clip and forms the male member of the universal joint.

The connection between the ball $c^2$ and the lever $a$ is by means of a metal strap $e$ the centre part of which is cupped to form a bearing for the part of the ball nearest the clip. This strap is perforated to accommodate the neck or stem of the ball with which it is engaged prior to fixing the ball to the clip. The upper part of the ball enters or lies within the channel of the lever $a$ and the final connection between the latter and the ball and clip is conveniently and economically effected by bending the free ends $e^1$ of the metal strap $e$ over the top of the control lever and securing it thereto by pressing the pointed extremities of the strap into a hole $a^2$ formed for the purpose in the top side of the control lever.

In this way a very simple cheap and effective universal connection is established between the clips $c$ secured to the handle shafts or supports $d$ and each part $a$, $a$ of the telescopic lever.

It was also found very necessary to provide for adjustment in the mounting for the bolt $f$ owing to the variation in the distance along the axle between the wheel and the adjacent frame member of the vehicle. At the same time it was found that unless the mounting was made very rigid there was a tendency for it to creep along the axle away from the wheel due to the reaction of the spring.

According to the present invention the barrel or casing $g$ in which the bolt $f$ slides is supported off the axle $h$ by means of a pair of clips in one $i$ of which the casing is free to slide whilst the other $i^1$ which supports the closed end of the casing is rigidly fixed to the casing.

As will clearly be seen from the transverse sectional view, Figure 5, the clips are formed so as to embrace the cylindrical casing and also to engage the axle $h$ which is usually of square shape in cross-section. Firm connection between the fixed clip $i^1$ and the casing or barrel $g$ may be conveniently and inexpensively made by punching the metal of the clip into recesses $g^1$ formed in the end of the casing. This effectually prevents any tendency for relative axial or rotary movement between this clip and the casing. The end of the casing is closed by a plug $g^2$ drilled for the passage of the Bowden wire $k$ and fixed in position by pressing the metal of the casing into an annular groove $g^3$ in the plug.

That portion of each clip which engages the axle is of such shape that when adjusted in position thereon and tightened up by bolts $l$ passing through its free ends it becomes a rigid fixture on the axle. For axles of square section this part of the clip, as shown in Figure 5, is of inverted V-section, the ends being slightly turned towards each other at $i^2$ for a short distance before running parallel to receive the transverse attachment bolt. Each clip as will be seen is made in one piece from strip metal folded over on itself and bent to shape the two parts being riveted together between the casing and the axle.

The flanged and slotted disc, $m$ which is adapted to receive the end of the locking bolt and which has a serrated edge $m^1$ for engagement with the spokes $n$ of the wheel, can be secured in position on the latter by means of a pair of metal straps $o$, as shown in Fig. 6, but preferably a C shaped plate $p$ shown in Figure 6a, is used for this purpose. In either case the straps or plate function as retaining devices for the disc between the serrated edge $m^1$ of which and the said plate or straps the spokes of the wheel are firmly clamped by means of screws $q$ passed through the disc into tapped holes in the straps or plate. This method although it entails the removal of the wheel from the axle, is found to be superior to the previously proposed method of splitting the disc and springing it over the axle.

The attachment of the Bowden wire $k$ to the lever $a$ is another point which has also received consideration. The arrangement now proposed is to form the free end of the lever with a lug $a^3$, Figure 7 which is formed with a keyhole slot $a^4$ and turned underneath the lever.

This provides a simple method of attaching the nipple on the end of the wire $k^1$ to the lever. The wire passes through a guide $r$ formed in a short arm $s$ which is made of strip metal and secured to the adjacent clip $c$ which carries the control lever $a$. This arm forms an abutment for the outer or incompressible member of the Bowden wire and the guide is preferably formed by bending over and riveting one end of the arm to itself.

I claim:—

1. In automatic brake mechanism of the class described the combination of a wheel locking device, and a lever mounted parallel with and in close proximity to the handle of the vehicle for controlling said device, said lever being made in two parts having a sliding engagement with a central member, the outer ends of said two parts being each detachably pivoted to said handle.

2. In automatic brake mechanism of the class described the combination of a wheel locking device, and a lever mounted parallel with and in close proximity to the handle of the vehicle for controlling said device, said lever being made in two parts having a sliding engagement with a central member each of said parts having a detachable and universally joined connection with the adjacent support for said handle.

3. In automatic brake mechanism of the class described the combination of a wheel locking device, and a lever mounted parallel with and in close proximity to the handle of the vehicle for controlling said device, said lever being made in two parts having a sliding engagement with a central member each of said parts having a detachable ball and socket connection with the adjacent support for said handle.

4. In automatic brake mechanism of the class described, the combination of a disc secured to one of the wheels of the vehicle, a casing adjustably mounted on the axle adjacent thereto, a bolt slidably mounted in said casing, a spring normally tending to force said bolt into engagement with said disc, a lever mounted parallel with and in close proximity to the handle of the vehicle and connected with said bolt, said lever being made in two parts each having a sliding engagement with a central member and each of said parts having a universally jointed connection with the supports for said handle.

5. A brake mechanism substantially universally applicable to vehicles of the type having a push-bar and supporting portions therefor and wherein said bar and supporting portions respectively may extend at varying angles at their connections as between different makes of vehicles, said mechanism comprising, in combination with wheel-braking means, a lever controlling said means, said lever being adjustable in length and lying in a plane parallel to the handle of the vehicle, and having its ends offset at a fixed angle, and a ball and socket connection mounting said lever ends respectively on the respective handle supports, whereby a reciprocatory movement may be had between said lever and said handle regardless of the angle of juncture between said handle and said supports.

6. A brake mechanism substantially universally applicable to vehicles of the type having a push-bar and supporting portions therefor and wherein said bar and supporting portions respectively may extend at varying angles at their connections as between different makes of vehicles, said mechanism comprising, in combination with wheel-braking means, a lever controlling said means, said lever having a central portion adjustable in length and extending parallel, and in adjacency, to the handle of the vehicle, and end portions extending at a permanently fixed angle to said central portion, and means for connecting said end portions to the supports for said handle, whereby a reciprocatory movement may be had between said central portion of said lever and said handle, regardless of the angle of juncture between said handle and supports.

7. A brake mechanism comprising a disc member having a transversely extending annular outer peripheral flange having its outer lateral edge formed wth a continuous series of small serrations adapted to receive the spokes of a vehicle wheel in some of said serrations, means for locking said spokes therein, a locking member engageable with said disc and mounted on the vehicle, and means for actuating said locking member.

REGINALD FORD.